United States Patent
Yaroshevich et al.

(10) Patent No.: US 11,100,001 B2
(45) Date of Patent: Aug. 24, 2021

(54) TECHNIQUES FOR IMPROVING SPACE UTILIZATION IN A CACHE

(71) Applicant: Sisense Ltd., Ramat Gan (IL)

(72) Inventors: Ariel Yaroshevich, Tel Aviv (IL); Jonathan Goldfeld, Omer (IL)

(73) Assignee: Sisense Ltd., Ramat Gan (IL)

(*) Notice: Subject to any disclaimer, the term of this patent is extended or adjusted under 35 U.S.C. 154(b) by 35 days.

(21) Appl. No.: 15/971,569

(22) Filed: May 4, 2018

(65) Prior Publication Data
US 2018/0322065 A1 Nov. 8, 2018

Related U.S. Application Data (60) Provisional application No. 62/501,135, filed on May 4, 2017.

(51) Int. Cl.
| | |
|---|---|
| G06F 12/0875 | (2016.01) |
| G06F 12/0871 | (2016.01) |
| G06F 12/0891 | (2016.01) |
| G06F 16/00 | (2019.01) |
| G06F 9/38 | (2018.01) |
| G06F 9/30 | (2018.01) |

(52) U.S. Cl.
CPC ........ *G06F 12/0875* (2013.01); *G06F 9/3017* (2013.01); *G06F 9/3808* (2013.01); *G06F 12/0871* (2013.01); *G06F 12/0891* (2013.01); *G06F 16/00* (2019.01); *G06F 2212/452* (2013.01)

(58) Field of Classification Search
CPC ........ G06F 12/0875; G06F 16/00; G06F 9/00; G06F 12/0871; G06F 12/0891; G06F 2212/452; G06F 9/3017; G06F 9/3808; G06F 9/30181
See application file for complete search history.

(56) References Cited

U.S. PATENT DOCUMENTS

| | | | |
|---|---|---|---|
| 5,669,011 A | 9/1997 | Alpert et al. | |
| 6,647,489 B1* | 11/2003 | Col | G06F 9/30058 712/226 |
| 9,098,296 B2 | 8/2015 | Roy | |
| 2005/0102493 A1* | 5/2005 | DeWitt, Jr. | G06F 9/30145 712/227 |
| 2010/0250854 A1* | 9/2010 | Ju | G06F 8/4442 711/125 |
| 2014/0068196 A1* | 3/2014 | Benoit | H04L 67/2852 711/135 |
| 2017/0123775 A1* | 5/2017 | Xu | G06F 8/451 |

(Continued)

*Primary Examiner* — Charles Rones
*Assistant Examiner* — Tong B. Vo
(74) *Attorney, Agent, or Firm* — M&B IP Analysts, LLC (57) ABSTRACT

A system and method for efficient cache space utilization by a processing circuitry having a cache. The method includes determining, among a plurality of instructions executed by the processing circuitry, a cacheable block of instructions for execution by the processing circuitry, wherein the cacheable block of instructions has an input, an output, and an intermediary result confined locally to the cacheable block of instructions; generating a unified instruction based on the cacheable block of instructions, wherein the unified instruction results in the same output as the cacheable block of instructions when the same input is received; and storing the unified instruction in the cache.

18 Claims, 4 Drawing Sheets

(56) References Cited

U.S. PATENT DOCUMENTS

2017/0177343 A1\* 6/2017 Lai ........................ G06F 9/3016
2018/0060374 A1\* 3/2018 Verma ................. G06F 16/2282
2018/0165210 A1\* 6/2018 Sethuraman ............ G06F 11/34
2018/0227355 A1\* 8/2018 Gao ........................ H04L 67/06

\* cited by examiner

TECHNIQUES FOR IMPROVING SPACE UTILIZATION IN A CACHE

CROSS-REFERENCE TO RELATED APPLICATIONS

This application claims the benefit of U.S. Provisional Application No. 62/501,135 filed on May 4, 2017, the contents of which are hereby incorporated by reference.

TECHNICAL FIELD

The present disclosure relates generally to computing caches, and more specifically to techniques for improved processor caching.

BACKGROUND

A column-oriented database management system, also referred to as a columnar database management system, is a database management system that stores data in a columnar database by column rather than by row. By storing data in columns rather than rows, the columnar database can more precisely access data needed to response to queries rather than scanning and discarding unwanted data in rows. As a result, query performance may be increased, particularly for large data sets.

One approach to increasing execution speed for queries in columnar databases includes caching intermediate execution results. Processors typically utilize caches to reduce the average cost (e.g., with respect to time or energy) to access data from the main memory. An underlying assumption for columnar database management systems is that there is a large number of recurring prefixes which do not need to be computed each time, as typically only the final steps of execution change from one instance to the next. Even at the lowest level of execution engines, columnar databases process entire columns per instruction. Consequently, saving intermediate results may incur substantial memory costs.

It would be advantageous to provide a solution that would reduce memory requirement from the cache while reducing processing time of the system.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for efficient cache space utilization by a processing circuitry including a cache. The method comprises: determining, among a plurality of instructions executed by the processing circuitry, a cacheable block of instructions for execution by the processing circuitry, wherein the cacheable block of instructions has an input, an output, and an intermediary result confined locally to the cacheable block of instructions; generating a unified instruction based on the cacheable block of instructions, wherein the unified instruction results in the same output as the cacheable block of instructions when the same input is received; and storing the unified instruction in the cache.

Certain embodiments disclosed herein also include a non-transitory computer readable medium having stored thereon causing a processing circuitry to execute a process, the process comprising: determining, among a plurality of instructions executed by the processing circuitry, a cacheable block of instructions for execution by the processing circuitry, wherein the cacheable block of instructions has an input, an output, and an intermediary result confined locally to the cacheable block of instructions; generating a unified instruction based on the cacheable block of instructions, wherein the unified instruction results in the same output as the cacheable block of instructions when the same input is received; and storing the unified instruction in the cache.

Certain embodiments disclosed herein also include a system for efficient cache space utilization. The system comprises: a processing circuitry including a cache; and a memory, the memory containing instructions that, when executed by the processing circuitry, configure the system to: determine, among a plurality of instructions executed by the processing circuitry, a cacheable block of instructions for execution by the processing circuitry, wherein the cacheable block of instructions has an input, an output, and an intermediary result confined locally to the cacheable block of instructions; generate a unified instruction based on the cacheable block of instructions, wherein the unified instruction results in the same output as the cacheable block of instructions when the same input is received; and store the unified instruction in the cache.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include a method and system for efficient cache space utilization by a processing circuitry including a cache. A cacheable block of instructions is determined among a plurality of instructions executed by the processing circuitry. The cacheable block of instructions includes an input, an output, and an intermediary result. The intermediary result is confined locally to the cacheable block of instructions. A joint instruction is generated based on the cacheable block of instructions and stored in the cache. In some embodiments, the joint instruction may be stored in the cache when a number of uses of the cacheable block of instructions is above a threshold.

Determining the cacheable block of instructions may further include identifying a potentially cacheable block of instructions including a first instruction, a second instruction, and an intermediary result of the first instruction used by the second instruction, such that the intermediary result is locally confined to the block of instructions. In an embodiment, determining the cacheable block of instructions may include identifying a block of instructions including the first instruction, the second instruction, and the intermediary result. The potentially cacheable block of instructions may be determined to be cacheable when a number of executions of the first instruction, the second instruction, or both, is above a respective threshold.

Figure 1:
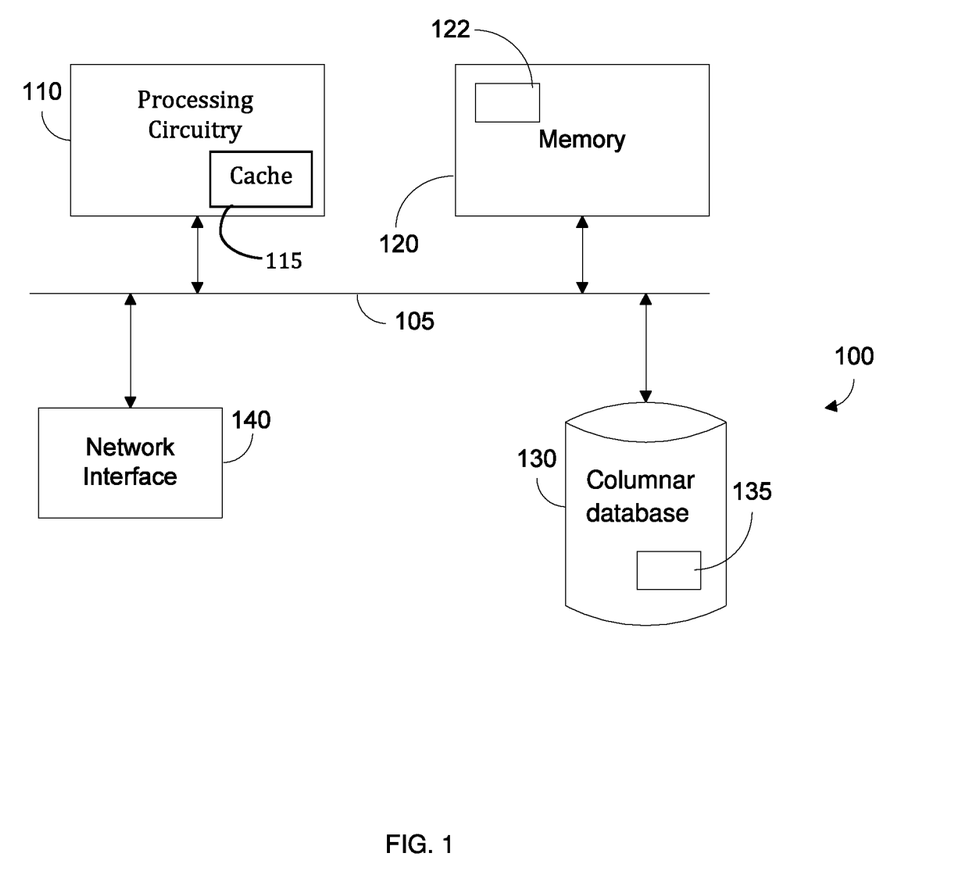
FIG. 1 is a schematic illustration of a columnar database management system according to an embodiment.

FIG. 1 is an example schematic illustration of a database management system 100 for efficient cache space utilization according to an embodiment. In an example implementation, the database management system 100 is a columnar database management system. The columnar database management system 100 includes at least one processing circuitry 110, for example, a central processing unit (CPU).

The processing circuitry 110 may be realized as one or more hardware logic components and circuits. For example, and without limitation, illustrative types of hardware logic components that can be used include may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing circuitry 110 includes a cache 115 for storing operators, operations, or both. At least some of the operators and operations may be utilized for accessing a columnar database 130. For example, frequently used operators and operations may be stored in the cache 115 to allow for more efficient access to and use of such operators and operations.

The processing circuitry 110 is coupled via a bus 105 to a memory 120. The memory 120 may be used as a working scratch pad for the processing circuitry 110, a temporary storage, and the like. The memory 120 may be a volatile memory such as, but not limited to random access memory (RAM), or non-volatile memory (NVM), such as, but not limited to, Flash memory.

The processing circuitry 110, the memory 120, or both, may also include machine-readable media for storing software. Specifically, the memory 120 may include a memory portion 122 configured to store software. Software shall be construed broadly to mean any type of instructions, whether referred to as software, firmware, middleware, microcode, hardware description language, or otherwise. The software, when executed by the processing circuitry 110, configures the processing circuitry 110 to perform the various processes described herein.

The processing circuitry 110 may be coupled to a network interface 140. The network interface 140 may be configured to provide connectivity such as, but not limited to, wired connectivity, wireless connectivity, and cellular connectivity. The wireless connectivity may be provided via a network (not shown) such as, but not limited to, including, for example, a local area network (LAN), a wide area network (WAN), a metro area network (MAN), the worldwide web (WWW), the Internet, a combination thereof, and the like.

The processing circuitry 110 is further coupled to the columnar database 130. The columnar database 130 includes a storage portion 135 containing one or more sets of column-oriented data.

It should be noted that the columnar database 130 is merely an example of a database which may demonstrate reduced processing time and cache use according to the disclosed techniques, and that the disclosed embodiments may be equally applicable to other types of databases. Similarly, the columnar database management system 100 is described merely for example purposes, and other database management systems may be equally utilized.

Figure 2:
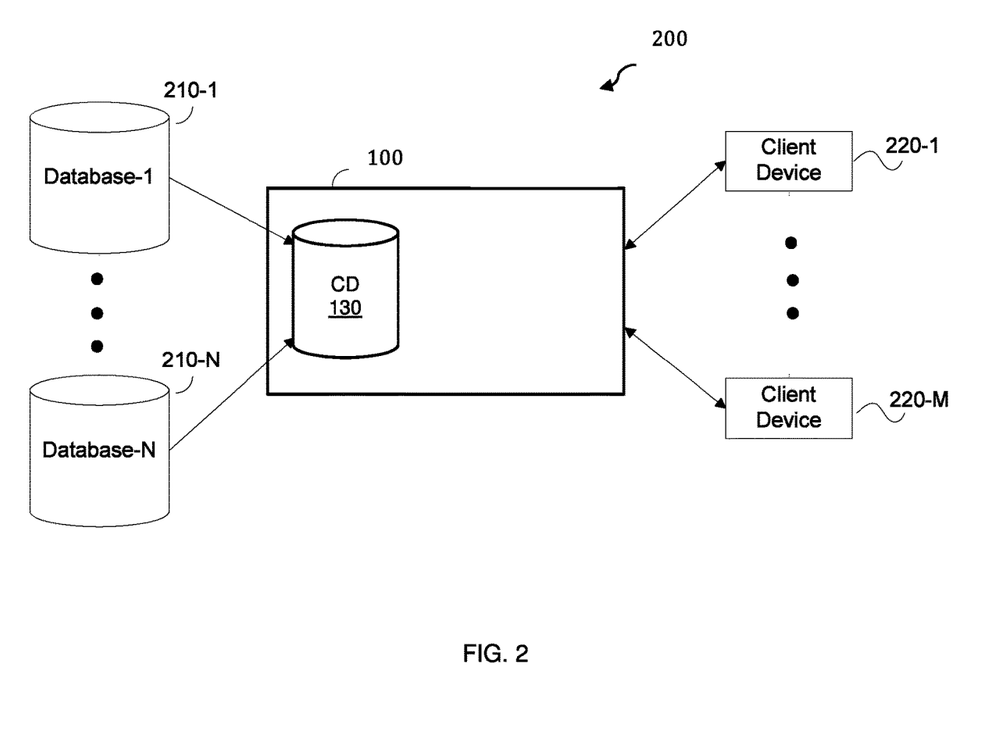
FIG. 2 is a schematic diagram illustrating a deployment of the columnar database management system.

FIG. 2 is an example schematic diagram 200 illustrating a deployment of the columnar database management system 100. In an embodiment, the columnar database management system 100 is communicatively connected to a plurality of databases 210-1 through 210-N (hereinafter referred to individually as a database 210 and collectively as databases 210, merely for simplicity purposes), where N is an integer greater than or equal to 1. In an example implementation, the columnar database management system 100 is a business intelligence system configured to collect data from the databases 210 and to generate datasets for storage in the columnar database (CD) 130 based on the collected data.

The columnar database 130 is configured to store datasets generated by the columnar database management system 100. The datasets may be used by the columnar database management system 100 to generate responses to queries, to supply information to a dashboard, and the like. For example, the columnar database management system 100 may be a BI system that is configured to generate key performance indicators (KPI), key quality indicators (KQI), statistical analysis, reports, and the like, which are stored in the columnar database 130. The columnar database management system 100 may be further configured to generate an enriched dataset based on one or more of the stored datasets.

The columnar database management system 100 is further communicatively connected to a plurality of client devices 210-1 through 210-M (hereinafter referred to individually as a client device 210 and collectively as client devices 210, merely for simplicity purposes), where M is an integer greater than or equal to 1.

The columnar database management system 100 is configured to receive instructions for execution on at least a portion of the columnar database 130. The columnar database management system 100 may be further configured to detect cacheable instructions as described herein and to store such instructions, their results, or both, in a cache of a processing circuitry (e.g., the cache 115 of the processing circuitry 110, FIG. 1). This caching reduces the execution time for the instruction set by not retrieving a previously executed instruction every time a new instance of the instruction is received.

Each client device 210 may be associated with a user account. The columnar database management system 100 is accessible to a user account through the respective client device 210. User accounts may be arranged in a hierarchy, which may or may not indicate a formal position a user of the user account carries in an organization.

A user account may be authorized to perform certain operations on datasets stored in the columnar database 130. The user account may be further authorized to access certain datasets or portions thereof stored in the columnar database 130. The authorizations may vary, for example, based on the position in the hierarchy of the user account. One or more operations performed by a user account may cause generation of an enriched dataset.

It should be noted that, in the example embodiments described with respect to FIG. 2, any of the components may be distributed over one or more networks (not shown). For example, the columnar database management system 100 may communicate with the client devices 210 over a local area network (LAN), over the Internet, and the like.

Figure 3A:
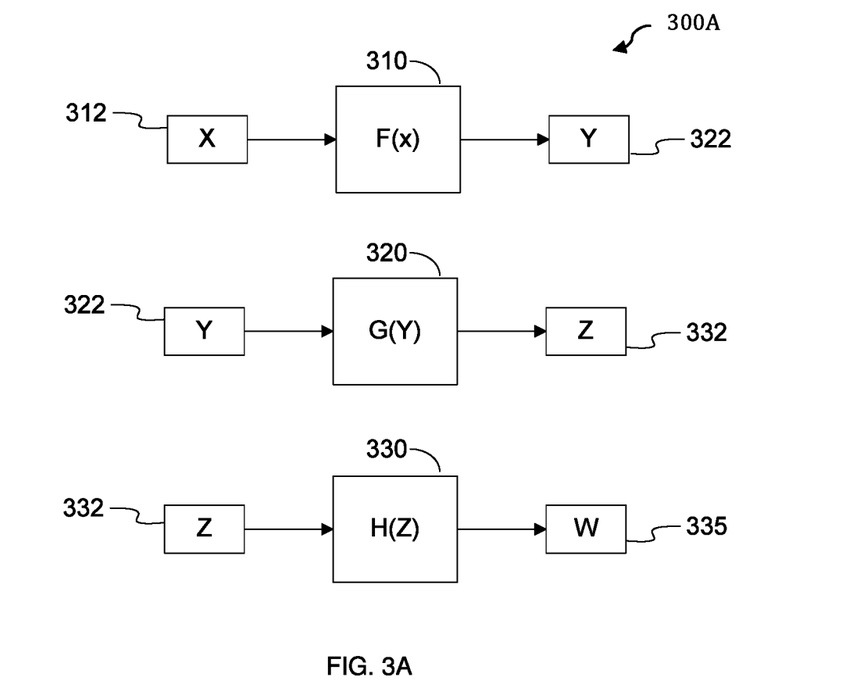
FIG. 3A is an illustration of a block of instructions utilized according to an embodiment.

FIG. 3A is an example schematic illustration of a block of instructions 300A having inputs and outputs including intermediary results according to an embodiment.

A first instruction 310 includes a first input 312 and a first output 322. The first output 322 is an intermediary result of the block of instructions 300A. The first instruction 310 may include sub-instructions. In some implementations, the first instruction 310 may have multiple inputs, multiple outputs, or both.

A second instruction 320 includes the first output 322 as a second input and a second output 332. The second output 332 is also an intermediary result. A third instruction 330 includes the second output 332 as a third input and a third output 335.

In an embodiment, a system (e.g., the columnar database management system 100 of FIG. 1) may be configured to store, in a cache, one or more of the instructions 310 through 330 according to caching rules. For example, an instruction may be stored in the cache according to predetermined rules, dynamic rules, or both. The system may determine that the first, second, and third instructions 310 through 330 should be stored in the cache.

In an embodiment, a single unified instruction may be generated from a plurality of other instructions and stored in the cache. For example, the instructions 310, 320, and 330 may be collectively stored as a single unified instruction (e.g., the instruction 340, FIG. 3B). This may be performed, for example, if the intermediary results 322 and 332 are confined locally to the block of instructions 300A. In an embodiment, intermediate results that are confined locally to the block of instructions 300A do not affect instructions outside of the block of instructions 300A. Generating a unified instruction allows for decreasing the computational overhead of using multiple separate instructions.

Figure 3B:
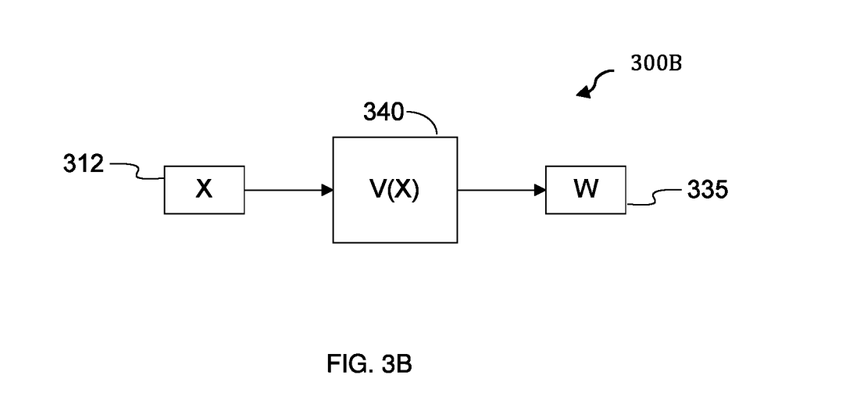
FIG. 3B is a cached joint instruction generated according to an embodiment.

FIG. 3B is an example schematic illustration 300B illustrating a unified instruction 340. The unified instruction 340 includes a plurality of instructions (e.g., the instructions 310 through 330, FIG. 3A). The instructions are related at least such that at least one output of a first instruction is an input (i.e., an intermediary result) of a second instruction. The unified instruction 340 provides an output based on an input. In the example implementation shown in FIG. 3B, the unified instruction 340 is generated based on the instructions 310 through 330, FIG. 3A. The unified instruction 340 therefore produces the third output 335 based on the first input 312.

In other embodiments, the unified instruction 340 may be generated from the first instruction 310 and the second instruction 320 such that the unified instruction 340 has inputs including the input 312 and outputs including the output 332.

In some embodiments, a cached instruction may remain cached for a period of time. The period of time may be dynamic (e.g., based on an amount of cache which is free, and the like) or predetermined.

In an embodiment, cached instructions are optimized to allow maximum use of the cache size. To this end, an optimal storage scheme of instructions may be determined based on sizes of instructions to be cached. The optimal storage scheme may include generating a unified instruction based on select instructions of a block of instructions such that the unified instruction use less cache memory than a single unified instruction generated based on all instructions in the block. The optimal configuration for storage may be based further on relative numbers of occurrences of the instructions.

As an example for optimizing caching of instructions, a first instruction has 'X' occurrences, a second instruction has 'Y' occurrences, and a third instruction has 'Z' occurrences. In this example, each of the first and second instructions occurs less often than the third instruction, however, the third instruction requires more space in the cache than the combined space utilized by the first instruction and the second instruction. A cache optimized based on instruction occurrences may prioritize the third instruction. However, in some cases storing the block of the first instruction and the second instruction in the cache may lead to overall shorter runtime of the instruction set.

Figure 4:
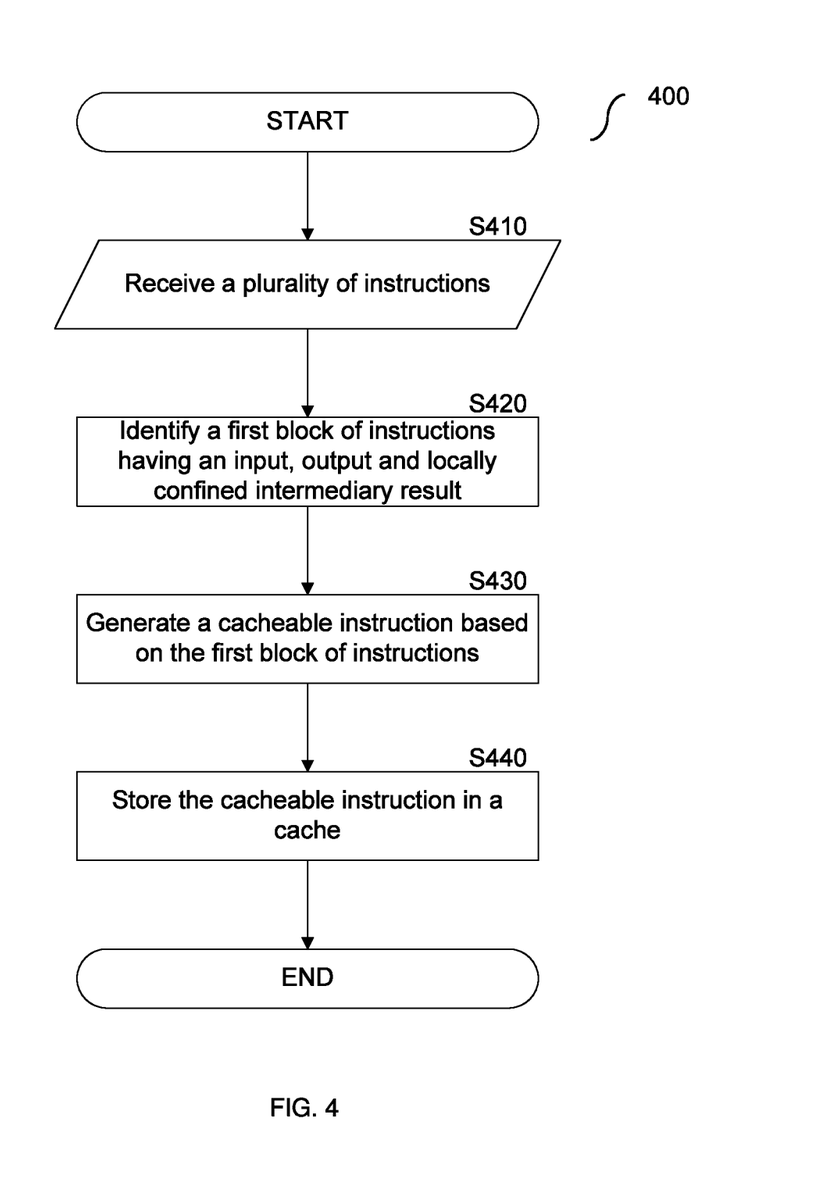
FIG. 4 is a flowchart illustrating a method for generating a joint instruction for improved cache space utilization according to an embodiment.

FIG. 4 is an example flowchart 400 illustrating a method for generating instructions for improved space utilization of a cache according to an embodiment.

At S410, instructions are received. The instructions may include one or more blocks of instructions which may be executed, for example, on a columnar database of the system. The execution may result in the generation of a dataset.

At S420, a block of instructions is identified from among the received instructions. The identified block of instructions has at least an input, an output, and an intermediary result which is confined locally to the block of instructions. In an embodiment, S420 may include performing a topological sorting analysis of the instructions in the block of instructions to determine if an intermediary result is locally confined. The identified block of instructions may have a plurality of inputs, a plurality of outputs, or both.

In an embodiment, all instructions of the identified block of instructions must meet the requirements of being stored in a cache of the system. For example, requirements for caching may include, but are not limited to, a minimum number of uses such that only frequently called instructions are cached. It should be noted that a requirement may be met differently by different instructions.

At S430, a cacheable instruction is generated based on the identified block of instructions. The cacheable instruction is a unified instruction generated based on the identified block of instructions, for example as described herein above with respect to FIG. 3B. Generating a unified instruction for use as a cacheable instruction may lead to better utilization of the processor cache. For example, a unified instruction may have a smaller overhead of storage than the overhead of storing two separate instructions in the cache.

At S440, the generated cacheable instruction is stored in a cache. The cacheable instruction may be stored in the cache for the duration of execution of the instruction set, for a predetermined period of time, for a dynamic amount of time, and the like. The storage time for the cacheable instruction may also be based on the size of the instruction and the space allocated by the cache or a total space available for the cache.

The amount of cache storage used may be significantly reduced by identifying recurring patterns of instructions sets (for example, by using machine learning) that can be replaced with a single unified instruction, thus negating the need for storing results of inner instructions that comprise the set. For example, if a first instruction and a second instruction are replaced with a unified instruction that receives the input of the first instruction and gives the output of the second instruction, it may be determined whether the first instruction is utilized outside of contexts in which the second instruction is utilized based on an output of the first instruction with no penalty to correctness or performance. If so, the first and second instructions may be replaced with a unified instruction, thereby reducing use of storage space.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for efficient cache space utilization by a processing circuitry including a cache, the method comprising:
    determining whether a number of executions of a first instruction is at or above a first threshold, wherein the first threshold is at least 2;
    determining whether a number of executions of a second instruction is at or above a second threshold when it is determined that the number of executions of the first instruction is at or above the first threshold;
    determining, among a plurality of instructions executed by the processing circuitry, a cacheable block of instructions for execution by the processing circuitry, wherein the cacheable block of instructions has an input, an output, and an intermediary result confined locally to the cacheable block of instructions, wherein the cacheable block of instructions includes the first instruction and the second instruction when it is determined that the number of executions of the first instruction is at or above the first threshold and that the number of executions of the second instruction is at or above the second threshold, wherein the first instruction generates the intermediary result based on the input, wherein the second instruction generates the output based on the intermediary result;
    generating a unified instruction based on the cacheable block of instructions, wherein the unified instruction results in the same output as the cacheable block of instructions when the same input is received; and
    storing the unified instruction in the cache.

2. The method of claim 1, wherein the unified instruction is stored in the cache for a predetermined amount of time.

3. The method of claim 1, wherein the unified instruction is removed from the cache when it is determined that a number of executions of the unified instruction is below a predetermined threshold for a period of time.

4. The method of claim 1, wherein determining the cacheable block of instructions further comprises:
    identifying a potentially cacheable block of instructions including the first instruction, the second instruction, and the intermediary result of the first instruction used by the second instruction that is locally confined to the identified block of instructions.

5. The method of claim 4, wherein the identified block of instructions is determined to be cacheable when the number of executions of the first instruction is at or above the first threshold.

6. The method of claim 4, wherein the identified block of instructions is determined to be cacheable when the number of executions of the second instruction is at or above the second threshold.

7. The method of claim 4, wherein the identified block of instructions is determined to be cacheable when the number of executions of the first instruction is above the first threshold and the number of executions of the second instruction is at or above the second threshold.

8. The method of claim 1, wherein the plurality of instructions is performed on a columnar database.

9. The method of claim 1, wherein the first threshold is different from the second threshold.

10. A non-transitory computer readable medium having stored thereon instructions for causing a processor to execute a process for efficient cache space utilization by a processing circuitry including a cache, the process comprising:
- determining whether a number of executions of a first instruction is at or above a first threshold, wherein the first threshold is at least 2;
- determining whether a number of executions of a second instruction is above a second threshold when it is determined that the number of executions of the first instruction is at or above the first threshold;
- determining, among a plurality of instructions executed by the processing circuitry, a cacheable block of instructions for execution by the processing circuitry, wherein the cacheable block of instructions has an input, an output, and an intermediary result confined locally to the cacheable block of instructions, wherein the cacheable block of instructions includes the first instruction and the second instruction when it is determined that the number of executions of the first instruction is at or above the first threshold and that the number of executions of the second instruction is at or above the second threshold, wherein the first instruction generates the intermediary result based on the input, wherein the second instruction generates the output based on the intermediary result;
- generating a unified instruction based on the cacheable block of instructions, wherein the unified instruction results in the same output as the cacheable block of instructions when the same input is received; and
- storing the unified instruction in the cache.

11. A system for efficient cache space utilization, comprising:
- a processing circuitry including a cache, wherein the processing circuitry is configured to execute at least a plurality of instructions; and
- a memory, the memory containing instructions that, when executed by the processing circuitry, configure the system to:
- determine whether a number of executions of a first instruction is at or above a first threshold, wherein the first threshold is at least 2;
- determine whether a number of executions of a second instruction is at or above a second threshold when it is determined that the number of executions of the first instruction is at or above the first threshold;
- determine, among a plurality of instructions executed by the processing circuitry, a cacheable block of instructions for execution by the processing circuitry, wherein the cacheable block of instructions has an input, an output, and an intermediary result confined locally to the cacheable block of instructions, wherein the cacheable block of instructions includes the first instruction and the second instruction when it is determined that the number of executions of the first instruction is at or above the first threshold and that the number of executions of the second instruction is at or above the second threshold, wherein the first instruction generates the intermediary result based on the input, wherein the second instruction generates the output based on the intermediary result;
- generate a unified instruction based on the cacheable block of instructions, wherein the unified instruction results in the same output as the cacheable block of instructions when the same input is received; and
- store the unified instruction in the cache.

12. The system of claim 11, wherein the unified instruction is stored in the cache for a predetermined amount of time.

13. The system of claim 11, wherein the unified instruction is removed from the cache when it is determined that a number of executions of the unified instruction is below a predetermined threshold for a period of time.

14. The system of claim 11, wherein the system is further configured to:
- identify a potentially cacheable block of instructions including the first instruction, the second instruction, and the intermediary result of the first instruction used by the second instruction that is locally confined to the identified block of instructions.

15. The system of claim 14, wherein the identified block of instructions is determined to be cacheable when the number of executions of the first instruction is at or above the first threshold.

16. The system of claim 14, wherein the identified block of instructions is determined to be cacheable when the number of executions of the second instruction is at or above the second threshold.

17. The system of claim 14, wherein the identified block of instructions is determined to be cacheable when the number of executions of the first instruction is at or above the first threshold and the number of executions of the second instruction is at or above the second threshold.

18. The system of claim 11, wherein the plurality of instructions is performed on a columnar database.

* * * * *